(12) United States Patent
Vachon et al.

(10) Patent No.: US 7,886,531 B2
(45) Date of Patent: Feb. 15, 2011

(54) EXHAUST SYSTEM HAVING OUTLET-LOCATED MOISTURE ENTRAINMENT DEVICE

(75) Inventors: Louis Foster Vachon, Washington, IL (US); Chandrasen Rameshlal Rathod, Peoria, IL (US); John Timothy Feeney, Dunlap, IL (US); Michael Brian Bour, Washington, IL (US); Chad Wayne Burman, Indian Trail, NC (US); Douglas Edgar Wilson, Henry, IL (US)

(73) Assignee: Caterpillar Inc, Peoria, IL (US)

( * ) Notice: Subject to any disclaimer, the term of this patent is extended or adjusted under 35 U.S.C. 154(b) by 685 days.

(21) Appl. No.: 11/905,311

(22) Filed: Sep. 28, 2007

(65) Prior Publication Data

US 2009/0084083 A1 Apr. 2, 2009

(51) Int. Cl.
*F01N 3/02* (2006.01)
(52) U.S. Cl. .............. 60/309; 60/274; 60/281; 60/308; 60/319; 60/324; 55/282.5; 55/428.1; 55/429; 55/DIG. 30
(58) Field of Classification Search ............ 60/274, 60/280, 281, 295, 303, 308, 309, 319, 324; 55/52, 53, DIG. 30, 282.2, 282.4, 282.5, 55/428.1, 429
See application file for complete search history.

(56) References Cited

U.S. PATENT DOCUMENTS

| | | | |
|---|---|---|---|
| 2,862,354 A * | 12/1958 | Barnhart | 96/53 |
| 2,921,432 A | 1/1960 | Marcotte et al. | |
| 3,817,221 A | 6/1974 | Nohira et al. | |
| 3,853,484 A * | 12/1974 | Sudar et al. | 422/113 |
| 4,023,365 A | 5/1977 | van Ginhoven | |
| 4,069,668 A | 1/1978 | Oldberg | |
| 4,279,223 A * | 7/1981 | Csonka et al. | 123/25 N |
| 4,467,774 A | 8/1984 | Becker et al. | |
| 4,827,715 A | 5/1989 | Grant et al. | |
| 5,133,185 A | 7/1992 | Gilbreath et al. | |
| 5,174,113 A | 12/1992 | Deville | |
| 6,357,227 B1 * | 3/2002 | Neufert | 60/309 |
| 6,367,256 B1 | 4/2002 | McKee | |
| 6,430,921 B1 | 8/2002 | Stuart et al. | |
| 6,613,130 B2 * | 9/2003 | Givargis | 95/287 |
| 6,615,612 B2 * | 9/2003 | Alexander | 65/27 |
| 6,725,847 B2 | 4/2004 | Brunemann et al. | |
| 6,748,741 B2 | 6/2004 | Martin et al. | |
| 6,804,949 B2 * | 10/2004 | Andrews et al. | 60/272 |
| 6,978,772 B1 | 12/2005 | Dorn et al. | |
| 7,007,459 B2 * | 3/2006 | Lee | 60/281 |
| 7,065,961 B1 | 6/2006 | Batten, Jr. | |
| 7,302,795 B2 * | 12/2007 | Vetrovec | 60/309 |
| 2006/0117754 A1 | 6/2006 | Hunt | |

OTHER PUBLICATIONS

Yilmaz et al., "Examination of Causes of Wetstacking in Diesel Engines," SAE Technical Paper Series, 2005-01-3138, 2005 (10 pages).

* cited by examiner

*Primary Examiner*—Binh Q Tran
(74) *Attorney, Agent, or Firm*—Finnegan, Henderson, Farabow, Garrett & Dunner LLP

(57) ABSTRACT

An exhaust system associated with a power source is disclosed. The exhaust system may have an exhaust stack extending from the power source to an exterior of the exhaust system and a moisture collection device disposed within the exhaust stack to collect moisture from the exhaust stack. The exhaust system may also have a moisture entrainment device associated with the moisture collection device to facilitate entrainment of the collected moisture into an exhaust flow of the power source.

21 Claims, 5 Drawing Sheets

EXHAUST SYSTEM HAVING OUTLET-LOCATED MOISTURE ENTRAINMENT DEVICE

TECHNICAL FIELD

The present disclosure relates generally to an exhaust system and, more particularly, to an exhaust system having a moisture entrainment device near an outlet of the exhaust system.

BACKGROUND

Engines, including diesel engines, gasoline engines, natural gas engines, and other engines known in the art, exhaust byproducts of combustion to the atmosphere. Typically, the byproducts are discharged via an exhaust stack that extends vertically from the engine or from an enclosure of the engine. As such, it is possible for precipitation to enter the exhaust stack when the engine is non-operational (i.e., when the exhaust stack is not being pressurized by a flow of exhaust). When the engine is operational, precipitation can also enter at the edge of the exhaust stack where the exhaust flow is weaker. It is also possible for moisture from the exhaust to condense in the passageways of the engine exhaust system as the exhaust cools. Moisture in the exhaust system can negatively impact components of the engine through corrosion (e.g., oxidation, staining, and rusting of interior and/or exterior exhaust passages, etc.) and mechanical interference (e.g., interference with engine valves and/or pistons of the engine). Moisture also may damage various exhaust system elements, such as after-treatment regeneration devices.

One way to minimize the effect of moisture in an engine exhaust passageway is to collect and contain the moisture within a confined area away from potential problem locations, until the moisture can be evaporated and entrained in outgoing exhaust. An example of this strategy is disclosed in U.S. Pat. No. 7,065,961 (the '961 patent) issued to Batten, Jr. on Jun. 27, 2006. Specifically, the '961 patent discloses a moisture trap formed as an integral part of an exhaust stack. In the '961 patent, tapered surfaces in the exhaust stack are provided to direct condensation downward and into a reservoir of the moisture trap. The condensation is retained in the reservoir until the temperature of the exhaust system reaches adequate magnitudes to evaporate the condensation and conduct it out of the exhaust system along with the exhaust gases.

Although the moisture trap of the '961 patent may help to minimize the effect that moisture may have on the associated exhaust system, it may still be problematic and have limited applicability. Specifically, once the moisture has been trapped in the reservoir, it may be difficult to empty the reservoir because the moisture trap of the '961 patent relies solely on the heat of the engine to vaporize and entrain the moisture. In some conditions, the heat from the engine may be inadequate to sufficiently vaporize the trapped moisture. Further, cooling passages are formed immediately external to the exhaust conduit of the '961 patent. These cooling passages may minimize the amount of engine heat transferred from the engine to the exhaust conduit and reduce the likelihood of vaporization.

The disclosed exhaust system is directed to overcoming one or more of the problems set forth above.

SUMMARY OF THE INVENTION

In one aspect, the present disclosure is directed to a moisture entrainment device in an exhaust system associated with a power source. The exhaust system may include an exhaust stack extending from the power source to an exterior of the exhaust system and a moisture collection device disposed within the exhaust stack to collect moisture from the exhaust stack. The exhaust system may also include a moisture entrainment device associated with the moisture collection device to facilitate entrainment of the collected moisture into an exhaust flow of the power source.

In another aspect, the present disclosure is directed to a method of removing moisture present in an exhaust stack of an exhaust system associated with a power source. The method may include directing the exhaust flow away from the power source and entraining the moisture present in the exhaust stack into the exhaust flow of the power source. The method may also include expelling the moisture as vapor into an exterior of the exhaust system.

DETAILED DESCRIPTION

Figure 1:
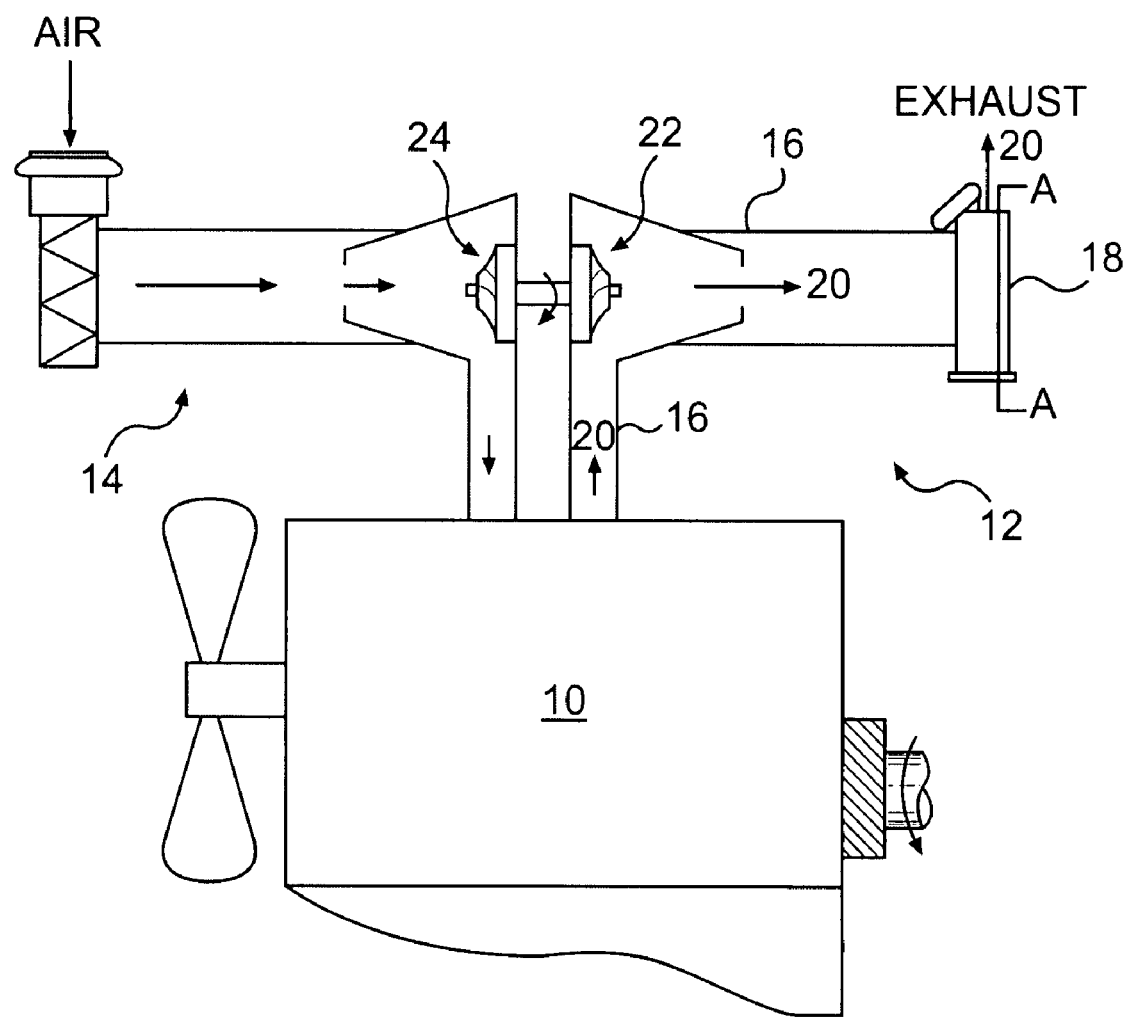
FIG. 1 is a diagrammatic illustration of a power source having an exemplary disclosed exhaust system.

FIG. 1 illustrates a power source 10 with an exemplary exhaust system 12. Power source 10 may embody an engine such as, for example, a diesel engine, a gasoline engine, a gaseous fuel-powered engine such as a natural gas engine, or any other engine apparent to one skilled in the art. Power source 10 may alternatively embody a non-engine source of power such as a furnace. Power source 10 may connect to an exhaust system 12 and an air induction circuit 14. Exhaust system 12 may direct exhaust away from power source 10. Exhaust system 12 may include an exhaust circuit 16 and an exhaust stack 18.

Exhaust system 12 may include a device for extracting energy from exhaust flow 20. For example, exhaust circuit 16 may include one or more turbines 22. Each turbine 22 may be connected to one or more compressors 24 of air induction circuit 14 to drive the connected compressor 24. It is also contemplated that turbines 22 may be omitted, if desired, and compressors 24 may be driven by power source 10, mechanically, hydraulically, electrically, or in any other manner known in the art. Exhaust system 12 may include additional, fewer, and/or different components than those mentioned. For example, exhaust system 12 may include catalyzed emission controlling devices, attenuation devices, and/or other components known in the art for extracting energy from, treating, and/or directing exhaust flow 20 away from power source 10.

Exhaust stack 18 may be connected to exhaust circuit 16, and exhaust stack 18 may be situated and configured to direct exhaust flow 20 to an exterior of exhaust system 12. Exhaust stack 18 may include, for example, an after-treatment device 26, a moisture collection device 28, a reservoir 29 of moisture collection device 28, and a moisture entrainment device 30 (e.g., FIG. 2). Moisture entrainment device 30 may take the moisture collected by moisture collection device 28, and moisture present in exhaust stack 18, and entrain the moisture as vapor into exhaust flow 20.

Figure 2:
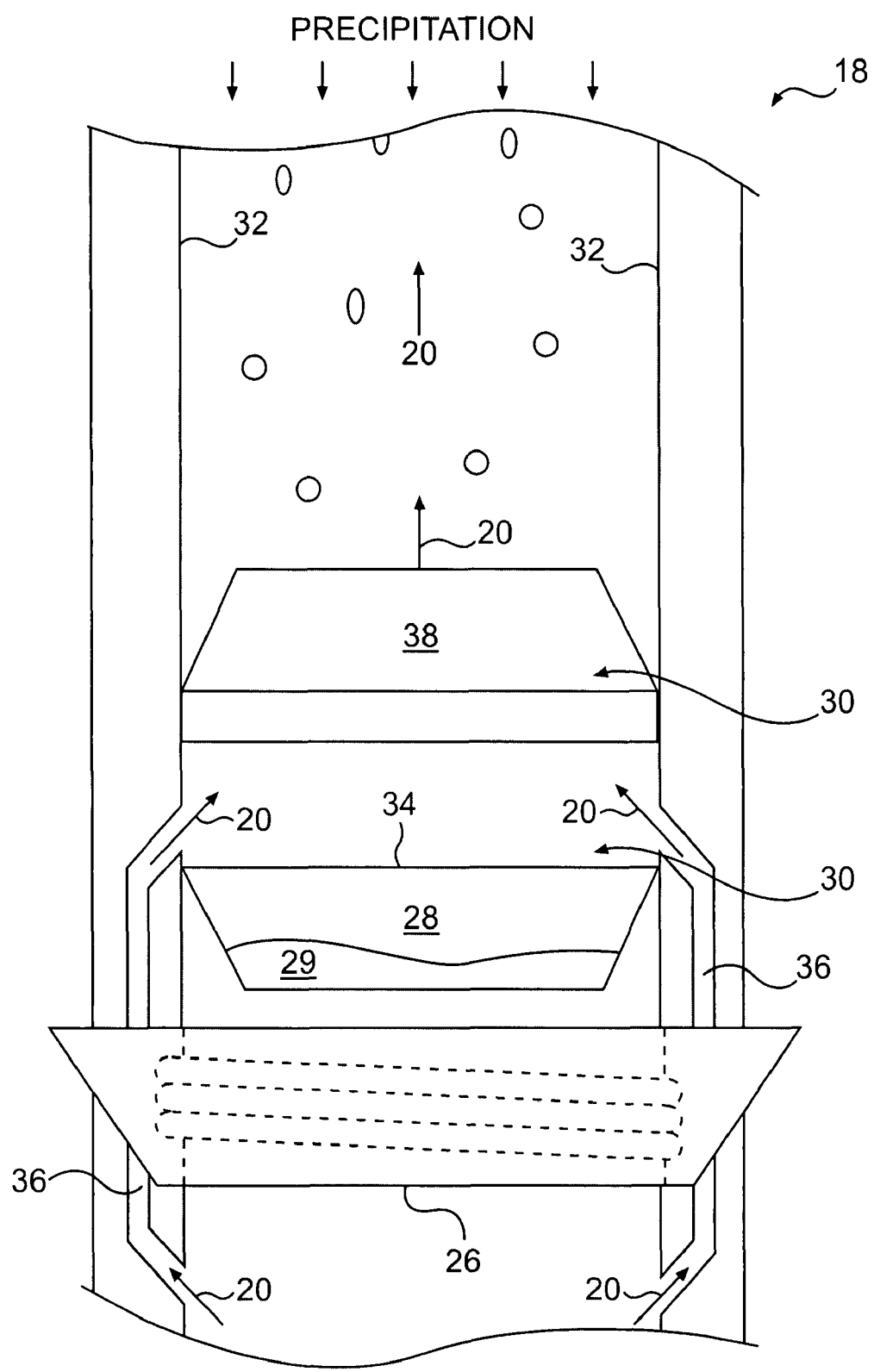
FIG. 2 is a cross section of the exhaust stack in FIG. 1 along line A-A, and shows a moisture collection device and an exemplary moisture entrainment device.

As shown in FIG. 2, a moisture collection device 28 may be above an after-treatment device 26. Moisture collection device 28 may be attached to exhaust stack 18 internal surface 32 and may have an opening 34 configured to reduce the escape of boiling liquid or low energy vapor. One exemplary embodiment of moisture entrainment device 30 is opening 34 of moisture collection device 28. Opening 34 of moisture collection device 28 may be larger, the same size, or smaller than the width or thickness dimension of reservoir 29 in moisture collection device 28. The depth of opening 34 may be varied to facilitate containing low energy vapor and preventing boiling liquid from escaping. In one exemplary embodiment, opening 34 may narrow toward moisture collection device 28 and toward the bottom of reservoir 29. In another exemplary embodiment, opening 34 may be shaped to prevent a direct line of sight between the moisture in reservoir 29 and the exhaust flow 20. Exhaust channels 36 may direct exhaust flow 20 to bypass moisture collection device 28. In different exemplary embodiments, exhaust channel 36 may be one to a plurality of exhaust channels 36 in exhaust stack 18. Exhaust channel 36 delivers exhaust above opening 34 and may draw vapor into main exhaust flow 20.

A moisture entrainment device 30 may be located above, at, or below moisture collection device 28. Moisture entrainment device 30 may help vaporize and expel precipitation and condensation from exhaust stack 18 and liquid trapped in moisture collection device 28. One embodiment of moisture entrainment device 30 may include venturi 38. Venturi 38 may have an opening narrower than the interior width of exhaust stack 18. The reduced diameter of the outlet of venturi 38 may generate turbulence in exhaust flow 20 and create an area of low pressure. The turbulence may take the heat at the center of exhaust flow 20 and spread the heat out to internal surface 32 and moisture collection device 28. The area of low pressure created may lower the liquid vapor line.

Figure 3:
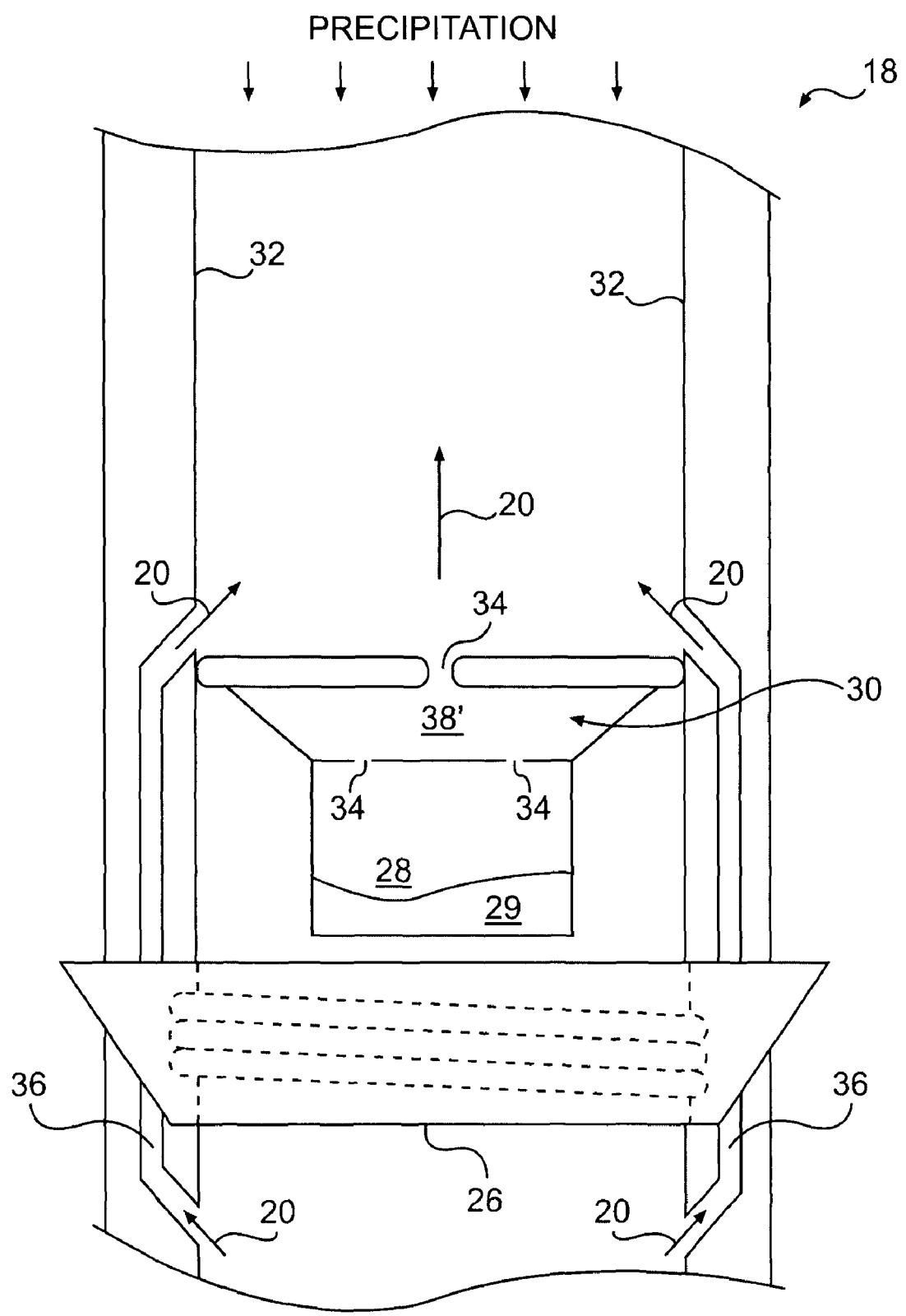
FIG. 3 is a cross section of the exhaust stack in FIG. 1 along line A-A, and shows a moisture collection device and an exemplary moisture entrainment device.

As shown in FIG. 3, an exemplary embodiment of moisture entrainment device 30 may include a moisture collection device 28 and a venturi 38'. In the exemplary embodiment, exhaust flow 20 may be directed by exhaust channels 36 above moisture collection device 28 with reservoir 29 and inverted cone venturi 38'. Opening 34 may be shaped to prevent a direct line of site between the moisture in reservoir 29 and the exhaust flow 20. Exhaust flow 20 may entrain moisture collected in reservoir 29 that escapes as vapor out of opening 34 in moisture collection device 28 through an inverted cone venturi 38'. In an alternate exemplary embodiment, inverted cone venturi 38 has a flat top.

Figure 4:
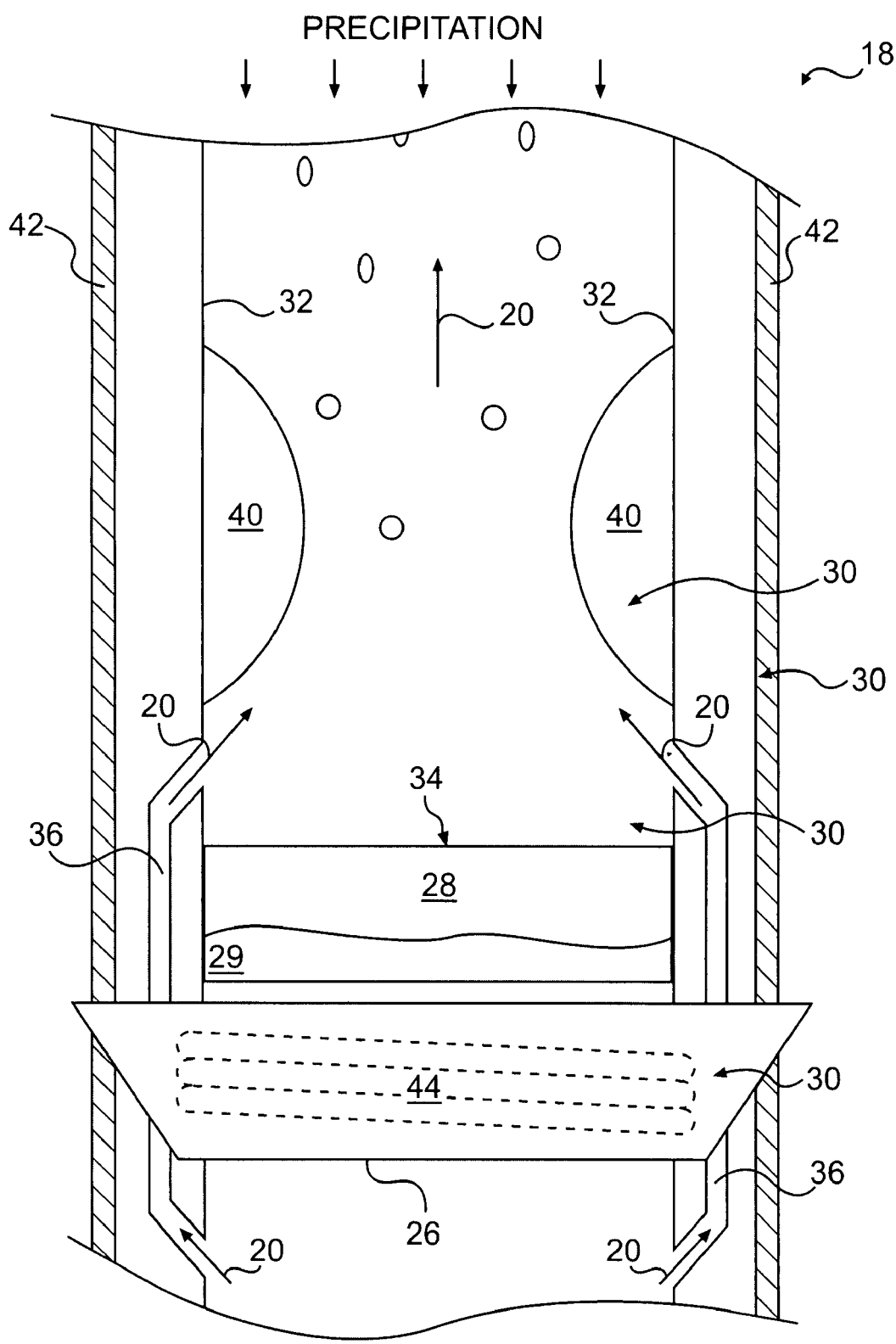
FIG. 4 is a cross section of the exhaust stack in FIG. 1 along line A-A, and shows a moisture collection device and other exemplary moisture entrainment devices.

As shown in FIG. 4, another embodiment of moisture entrainment device 30 may include a plurality of vanes 40. Plurality of vanes 40 may extend from the periphery of exhaust stack 18 toward the center of exhaust stack 18. In an exemplary embodiment, plurality of vanes 40 may be substantially aligned with the center of exhaust stack 18. Plurality of vanes 40 may facilitate the movement of moisture from an internal surface 32 to the central portion of exhaust flow 20 where the temperature is higher.

Another exemplary embodiment of moisture entrainment device 30 may include insulating exhaust stack 18 via insulation 42. Insulation 42 may include any of, or some combination of, exhaust stack 18 with double walls with air gaps therebetween, insulation applied to the outside of exhaust stack 18, and/or insulation applied to the inside of exhaust stack 18. In one exemplary embodiment, the length of exhaust stack 18 may be insulated. Alternatively, only certain portions of exhaust stack 18 may be insulated. Insulation 42 may be made of graphite composites, fiberglass, aluminized polyester, aluminum, ceramics, or other materials known to one of ordinary skill in the art. Insulation 42 may maintain or raise the temperature of moisture collection device 28 and exhaust flow 20 in exhaust stack 18.

In another exemplary embodiment, moisture entrainment device 30 may employ a heating device 44 associated with moisture collection device 28, or may use the heat from elements of exhaust system 12, such as after-treatment device 26. One example of a heating device 44 may be a coil around or otherwise associated with exhaust stack 18. Moisture collection device 28 and moisture entrainment devices 30 may have an increased temperature due to heating device 44, or due to using the heat from other elements of exhaust system 12.

Figure 5:
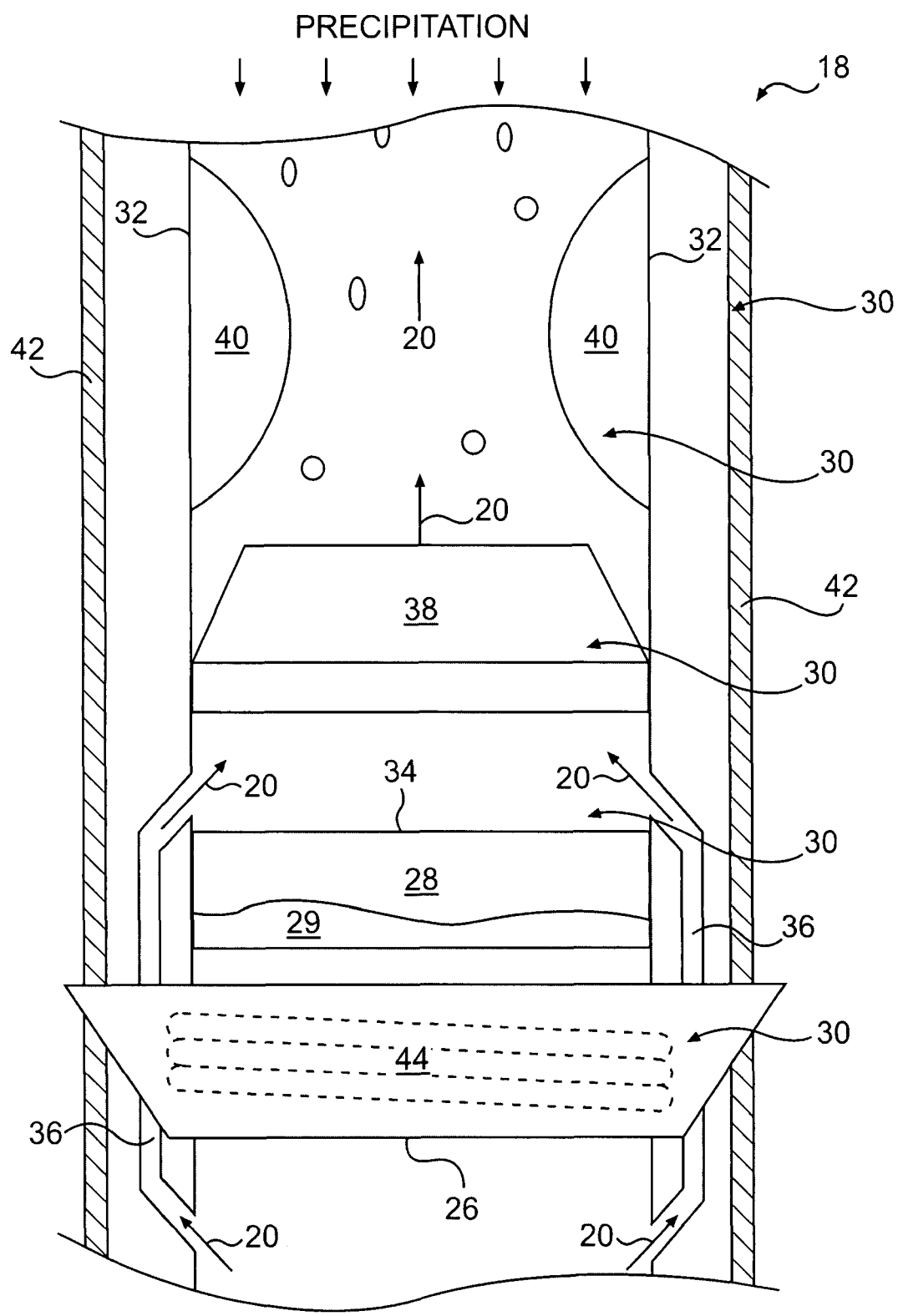
FIG. 5 is a cross section of the exhaust stack in FIG. 1 along line A-A, and shows a moisture collection device and several exemplary moisture entrainment devices used in concert.

As shown in FIG. 5, a moisture collection device 28 may be located above an after-treatment device 26. Moisture collection device 28 may be attached to internal surface 32, and may have an opening 34 configured to reduce the escape of boiling liquid or low energy vapor. Moisture entrainment device 30 may be located above, at, or below moisture collection device 28. The exemplary embodiment of FIG. 5 may include various features illustrated in FIGS. 2, 3, and 4. For example moisture entrainment device 30 may include an opening 34, venturi 38, a plurality of vanes 40, a heating device 44 or heat from elements of exhaust system 12, insulation 42 of exhaust stack 18, or may include any combination of an opening 34, venturi 38, plurality of vanes 40, a heating device 44 or heat from elements of exhaust system 12, and insulation 42. Moisture entrainment device 30 may vaporize and/or expel precipitation and condensation from exhaust stack 18, and any liquid trapped in moisture collection device 28.

INDUSTRIAL APPLICABILITY

The disclosed embodiments may be applicable to any power source 10 such as, for example, an engine, a furnace, or any other power source 10 known in the art where precipitation or condensation may cause damage to exhaust system 12 (including after-treatment device 26), may cause damage to power source 10, may affect performance of power source 10, or may cause discoloring or damage to the exterior of exhaust stack 18. The disclosed embodiments may extend the useful life of exhaust stack 18, after-treatment devices 26, and power source 10. The disclosed embodiments may also improve performance of power source 10, and reduce discoloring of the exterior of exhaust stack 18 by reducing the amount of moisture in exhaust stack 18 that is in liquid form. The operation of exhaust system 12 will now be explained.

Atmospheric air may be drawn into air induction circuit 14, mixed with fuel, and then be combusted by power source 10 to produce mechanical work and an exhaust flow 20. Exhaust flow 20 may contain gaseous compounds and solid particulate matter. Exhaust flow 20 may be directed from power source 10 to turbines 22 in exhaust system 12, and then directed via exhaust stack 18 to an exterior of exhaust system 12. In exhaust stack 18, condensation and precipitation may be present or collected in moisture collection device 28.

In moisture collection device 28, the moisture can escape as vapor through opening 34 which may prevent the escape of low energy vapor and boiling moisture that is not vaporized. Low energy vapor is more likely than high energy vapor to become condensation before the moisture is expelled by exhaust flow 20 to an exterior of exhaust system 12. Opening 34 may reduce the amount of moisture in exhaust flow 20 that condenses on internal surface 32 or that is expelled from exhaust stack 18 in a liquid form, reducing the discoloring of the exterior of exhaust stack 18. The use of exhaust channel 36 may increase the temperature of moisture collection device 28 and draw escaping vapor from opening 34 back into exhaust flow 20.

The condensation and precipitation in exhaust stack 18, and moisture in moisture collection device 28 may also be vaporized by other moisture entrainment devices 30. Venturi 38 may generate turbulence, and create a low pressure area. The turbulence may direct heat to internal surface 32 and to moisture collection device 28, increasing the moisture vaporized. The low pressure may lower the liquid vapor line causing more moisture to be entrained as vapor. Plurality of vanes 40 may move moisture from internal surface 32 to the central portion of exhaust flow 20 where the higher temperature may allow the moisture to be more easily entrained as vapor.

Other exemplary moisture entrainment devices 30 are insulation 42 and heating device 44. Insulating exhaust stack 18, using a heating device 44, and/or employing a heat source near moisture collection device 28, may increase the temperature in exhaust stack 18 and in the vicinity of moisture collection device 28, entraining more of the moisture. An increased temperature may make any other moisture entrainment devices 30 in exhaust stack 18 more effective. An increased temperature may also help keep more of the vapor in exhaust flow 20 in a vapor state, reducing the amount of condensation. Additionally, increasing the temperature may also help vaporize more precipitation that enters exhaust stack 18 near internal surface 32.

The combination of venturi 38, plurality of vanes 40, heating device 44 or heat from elements of exhaust system 12, and insulation 42, along with moisture collection device 28 and opening 34 may reduce the liquid moisture in exhaust stack 18 due to precipitation, condensation, and moisture collected in moisture collection device 28. Employing more of the various embodiments and features together, may result in more moisture being entrained and expelled from exhaust stack 18 as vapor.

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An exhaust system associated with a power source, comprising:
    a generally vertically oriented exhaust stack configured to direct exhaust flow from the power source to an exterior of the exhaust system, the exhaust stack including an end that is configured to allow the exhaust flow to directly flow to the atmosphere;
    a moisture collection device disposed within the exhaust stack to collect moisture from the exhaust stack; and
    a moisture entrainment device associated with the moisture collection device to facilitate entrainment of the collected moisture into the exhaust flow of the power source flowing upward through the exhaust stack.

2. The exhaust system of claim 1, wherein the moisture is the result of precipitation from the atmosphere entering the end of the exhaust stack that is configured to allow the exhaust flow to directly flow to the atmosphere.

3. The exhaust system of claim 1, wherein the moisture is the result of condensation from the exhaust flow onto an internal surface of the exhaust stack.

4. The exhaust system of claim 1, wherein the moisture entrainment device includes an opening as the inlet of the moisture collection device.

5. The exhaust system of claim 4, wherein the moisture collection device narrows away from the opening of the moisture collection device.

6. The exhaust system of claim 1, wherein the moisture entrainment device includes a venturi located proximal to an inlet of the moisture collection device.

7. The exhaust system of claim 1, wherein the moisture entrainment device includes a plurality of vanes extending from a periphery of the exhaust stack toward a center of the exhaust stack.

8. The exhaust system of claim 7, wherein the plurality of vanes are substantially aligned parallel with a central axis of the exhaust stack.

9. The exhaust system of claim 7, wherein the plurality of vanes are configured to redirect moisture from an exhaust stack internal surface into a central portion of the exhaust flow.

10. The exhaust system of claim 1, wherein the moisture entrainment device includes a heating device associated with the moisture collection device.

11. The exhaust system of claim 1, wherein the moisture entrainment device includes one or more of the following:
    a venturi;
    a plurality of vanes extending from a periphery of the exhaust stack toward a center of the exhaust stack;
    a dimension of an inner surface of the moisture collection device which narrows towards a bottom of the moisture collection device; and
    a heating device associated with the moisture collection device.

12. A method of removing moisture present in a generally vertically oriented exhaust stack of an exhaust system, comprising:
    directing an exhaust flow away from a power source upward through the generally vertically oriented exhaust stack;
    collecting moisture from the exhaust stack, the moisture resulting from precipitation from the atmosphere entering an end of the exhaust stack;
    entraining the collected moisture into the exhaust flow flowing upward through the exhaust stack; and
    expelling the entrained moisture as a vapor from the end of the exhaust stack.

13. The method of claim 12, wherein entraining further includes redirecting the moisture into a central portion of the exhaust flow.

14. The method of claim 12, wherein entraining further includes redirecting moisture from an outer periphery of the exhaust flow toward a central portion of the exhaust flow.

15. The method of claim 12, wherein entraining further includes decreasing the pressure in the exhaust stack proximal to the moisture.

16. The method of claim 12, wherein entraining further includes increasing the temperature in the exhaust stack proximal to the moisture.

17. A machine, comprising:
    a power source configured to produce a power output and an exhaust flow; and
    a generally vertically oriented exhaust stack configured to direct the exhaust flow upward from the power source and out an end of the exhaust stack to the atmosphere, the exhaust stack comprising:

a moisture collection device configured to collect condensation and precipitation, wherein the moisture collection device narrows toward a bottom of the moisture collection device, an exhaust channel directing the exhaust flow above the moisture collection device and a reservoir of the moisture collection device, and a moisture entrainment device entraining the collected moisture into the exhaust flow of the power source.

18. The machine of claim 17, wherein the moisture entrainment device further includes:

an inverted cone venturi located proximal to the opening of the moisture collection device.

19. The machine of claim 17, wherein the end of the exhaust stack is configured to be open to the atmosphere to allow the precipitation to enter the exhaust stack and to allow the exhaust flow to directly flow to the atmosphere.

20. The machine of claim 17, wherein the collected condensation includes condensation from the exhaust flow onto an internal surface of the exhaust stack.

21. The method of claim 12, wherein the moisture further results from condensation from the exhaust flow onto an internal surface of the exhaust stack.

* * * * *